United States Patent [19]

Cole et al.

[11] Patent Number: 5,068,134

[45] Date of Patent: Nov. 26, 1991

[54] METHOD OF PROTECTING GALVANIZED STEEL FROM CORROSION

[75] Inventors: James A. Cole; William O. Roberts, both of Wilmington, Del.; Joseph T. Turgeon, Parma, Ohio

[73] Assignee: Zaclon Corporation, Cleveland, Ohio

[21] Appl. No.: 453,334

[22] Filed: Dec. 19, 1989

Related U.S. Application Data

[63] Continuation of Ser. No. 208,689, Jun. 20, 1988, abandoned.

[51] Int. Cl.$^5$ .................. B05D 1/18; B05D 1/36; C23C 2/06
[52] U.S. Cl. .............. 427/376.2; 427/376.4; 427/387; 427/397.7; 427/397.8; 427/406; 427/419.1; 427/419.2; 427/431; 427/433; 427/436
[58] Field of Search ............ 427/376.4, 387, 397.7, 427/397.8, 376.2, 406, 431, 433, 436, 419.1, 419.2

[56] References Cited

U.S. PATENT DOCUMENTS

| | | | |
|---|---|---|---|
| 2,859,146 | 11/1958 | Prust | 148/6.15 |
| 2,952,562 | 9/1960 | Morris et al. | 427/397.7 |
| 3,383,189 | 5/1968 | Sendzimir | 427/431 |
| 3,849,141 | 11/1974 | Palm et al. | 427/406 |
| 4,169,916 | 10/1979 | Tsutsui et al. | 427/397.8 |
| 4,209,555 | 6/1980 | Stewart | 427/397.8 |
| 4,222,779 | 9/1980 | Bengali et al. | 106/14.12 |
| 4,246,317 | 1/1981 | Helwig | 427/397.8 |
| 4,330,446 | 5/1982 | Miyosawa | 523/409 |
| 4,365,003 | 12/1982 | Danforth et al. | 148/6.2 |
| 4,389,463 | 6/1983 | Smeggil et al. | 428/659 |
| 4,450,209 | 5/1984 | Hara et al. | 428/626 |
| 4,477,491 | 10/1984 | Sato et al. | 427/397.8 |
| 4,487,815 | 12/1984 | Dorsett et al. | 427/406 |
| 4,657,599 | 4/1987 | Sutherland | 427/397.8 |

FOREIGN PATENT DOCUMENTS

| | | | |
|---|---|---|---|
| 481742 | 3/1976 | Australia | 427/406 |
| 55-110783 | 2/1979 | Japan | 427/406 |
| 55-164260 | 12/1980 | Japan | . |
| 56-05167 | 1/1981 | Japan | 427/397.8 |

OTHER PUBLICATIONS

Henry, "Inorganic Zinc Rich Primers—Fact and Fancy", Materials Performance, pp. 19-27, May 1978.
Berger, "Alkyl Polyol Silicate Zinc-Rich Primers", Metal Finishing, Apr. 1979, pp. 27-32.

*Primary Examiner*—Shrive Beck
*Assistant Examiner*—Margaret Burke
*Attorney, Agent, or Firm*—Pearne, Gordon, McCoy & Granger

[57] ABSTRACT

This invention is directed to a process of protecting galvanized metal from white rust corrosion which comprises treating the galvanized metal, i.e., zinc-containing coating, at a temperature above about 125° C. with at least one silica compound.

18 Claims, No Drawings

METHOD OF PROTECTING GALVANIZED STEEL FROM CORROSION

This is a continuation of application Ser. No. 07/208,689, filed on June 20, 1988 now abandoned.

BACKGROUND OF THE INVENTION

This invention is directed to a method of protecting galvanized steel from corrosion, i.e., white rust, by treating either zinc-coated metal or zinc-alloy-coated metal with effective amounts of a silica compound. More specifically, the invention is directed to a method of protecting galvanized metal from white rust by subjecting the galvanized coating, i.e., the zinc-coated metal, following the galvanizing process, to a treatment with silica at metal immersion temperatures at above about 125° C. or higher to obtain a galvanized product resistant to corrosion known as white rust.

In the production of hot-dipped galvanized metals, such as sheet or tubing, the metal substrate is immersed or dipped into the molten metal for a time sufficient to obtain a uniform coating. Zinc coatings are generally characterized as having good adherence to metal substrate. Generally, the temperatures of the zinc bath range from about 435° to 455° C., or higher. However, temperatures in excess of about 480° C. are avoided, since there is a tendency for the metal to oxidize at higher temperatures, and also requires additional time for the coating to solidify.

After the metal substrate has been galvanized, it is generally characterized as having a bright metal luster. Under storage conditions, however, the galvanized products are often subjected to humid conditions, whereby moisture causes the formation of what is known as "white rust" or "wet storage stain." Wet storage or white rust stains occur, for example, during shipment or storage of the galvanized product because of condensation which results from temperature change and humidity. The stain is characterized as a white or gray corrosion material which is primarily basic zinc carbonate, hydroxide, and zinc oxide.

This invention relates to the treatment of galvanized metals, e.g., zinc or zinc-containing alloys on steels, to inhibit wet storage staining or the formation of white rust. More particularly, it relates to the use of silica compounds immediately upon removing the galvanized metal from the molten zinc by subjecting the coated metal with a silica compound at metal immersion temperatures in excess of about 125° C. or higher. The method of treating the galvanized surfaces in accordance with this invention provides protection against wet storage staining of zinc coatings and avoids, or substantially reduces and retards, the formation of white rust corrosion.

The presence of white rust generally impairs the appearance of the coated articles, and also prevents the adhesion of coating, such as paint and the like, to the metal surface. Thus, in view of the ever increasing demand for galvanized steel products, the problem of wet storage staining or white rust has become acute in the steel industry, and although many methods and compositions for treating galvanized steel and/or zinc surfaces to prevent white rust have been suggested, none have been found to be entirely satisfactory for one or more reasons.

Most common white rust inhibitors are based on the use of chromic acid or salts of chromic acid, in combination with various other compounds such as phosphates, silicates, and the like. Most chromates are toxic and present disposal problems in view of regulations promulgated by the Environmental Protection Agency.

For example, U.S. Pat. No. 3,687,738 discloses chromic acid compounds in an alcohol medium. Similarly, U.S. Pat. No. 3,907,608 suggests the use of pulverulent metal and chromium compounds in a liquid medium containing water and high boiling organic liquids. These coatings provide protection against rust upon exposing the surfaces to salt and the like. U.S. Pat. No. 4,659,394 discloses a process for the preparation of anticorrosive treated steel plate having zinc or aluminum-type coatings by use of a chromate film. U.S. Pat. No. 4,225,351 discloses a method of preventing corrosion of zinc-plated surfaces by treatment with a solution comprising sulfuric acid, hydrogen peroxide, and a silicate, with certain organic phosphorus compounds. U.S. Pat. No. 4,225,350 likewise discloses the resistance of zinc-plated surfaces to corrosion by treating the zinc surface with certain silicate-containing solutions and organic phosphorous compounds.

Thus, while a number of treatments have been developed to inhibit the formation of white rust, with varying degrees of success, there are a number of drawbacks, particularly when the treatments include the use of chromium compounds. Therefore, while the treatments have been useful for reducing white rust, they are considered objectionable due to the chromium salts, which impart an undesirable yellow color to the galvanized sheet and violate disposal regulations promulgated by the Environmental Protection Agency.

SUMMARY OF THE INVENTION

It has been found in accordance with the present invention that ferrous substrates, particularly zinc-coated metals such as galvanized steel, can have outstanding protection against white rust by subjecting the zinc-coated substrates to a treatment of silica at temperatures in excess of about 125° C. The silica useful for purposes of this invention are compounds selected from the group consisting of at least one alkali metal silicate, such as sodium, potassium, or lithium silicate, organic silicates or silica, i.e., $SiO_2$. While it is not completely understood, it is believed that the silica treatment following the galvanizing coating process results in the addition of the silicon ions in the zinc coating to form a zinc-silicate complex which is highly resistant to white rust.

Thus, it has been found that by treating a freshly galvanized surface with an alkali metal silicate at galvanizing temperatures, the finished product is protected against wet storage or white rust. By using the silica treatment in accordance with this invention, the ultimate or final coatings retain their resistance to corrosion over substantially long periods even under adverse conditions of moisture, and do not result in coatings with yellowish discoloration of the galvanized surface due to the addition of chromates.

Accordingly, it is the purpose of this invention to provide a novel and improved method for treating the surface of galvanized metals to provide extra corrosion resistance.

It is another purpose of this invention to provide a method for treating galvanized steel with a silica compound to improve the resistance of the galvanized metal to white rust corrosion.

Included in this invention is a method of inhibiting the corrosion of galvanized metal by subjecting the zinc-coated metal to a treatment of a silica compound at elevated temperatures.

This invention also provides a novel method of protecting galvanized metal from white rust corrosion by subjecting the freshly zinc-coated metal to a silica compound at elevated temperatures.

These and other advantages of the invention will become obvious from a further, more detailed description of the invention.

DETAILED DESCRIPTION OF THE INVENTION

In general, zinc has been used as a typical metal plating for improving the corrosion resistance of metal, such as steel strips and the like. The zinc coating protects the metal surface from corrosion by a sacrificial corrosion protection of the zinc.

For example, in a continuous process of producing hot-dip galvanized sheet metal, endless ferrous metal strip is continuously passed through a molten bath comprised substantially of metallic zinc. Typically, the zinc bath temperatures range anywhere from about 435° to about 455° C. The higher temperatures increase the fluidity and provide better drainage of the excess hot dip coating, thereby allowing a thinner and more controlled coating thickness. However, bath temperatures above about 480° C. are avoided, due to the increased oxidation of the metal and attack of the ferrous metal of the bath container.

More specifically, zinc coatings are applied to steel specimens by dipping professionally cleaned specimens into molten baths at temperatures of about 450° C. The molten baths are contained in kettles, with immersion times varying anywhere from 2 to 75 seconds, but generally ranging from about 5 to 10 seconds. As each specimen of metal is removed from the hot bath, excess coating material is removed. After removing the metal from the galvanizing bath, the zinc-coated substrate is treated with a silica compound at metal immersion temperatures of approximately 125° C. or higher, e.g., 150° C. and above. The silica compound, for purposes of this invention, includes both inorganic and organic silicates, such as, for example, the alkyl silicates such as ethyl, propyl, or butyl silicates, as well as the alkoxyl silicates such as ethylene glycol monoalkyl silicates, isobutyl silicate, etc., and various other aryl silicates such as phenyl silicate. For economic reasons, however, the preferred organic silicates are the lower alkyl silicates such as ethyl silicate. The inorganic silicates are even more economical in that they are readily attainable in aqueous solutions. The term "silicates" as used herein is intended to include both solutions and hydrosols, with the preferred silicates including the inorganic alkali metal silicates in aqueous solution. These silicates are water-soluble and include the sodium, potassium, and lithium silicates or combinations thereof.

When utilizing an alkali metal silicate, e.g., such as sodium silicate, the mole ratio of the $SiO_2$ to the $Na_2O$ generally ranges between 1:1 and 4:1. When utilizing the alkali metal silicates in aqueous solution, the aqueous solutions of the silicate generally range from about 0.1 to 5.0% by weight of the silicate. Preferably, the silicates are present in solution in amounts ranging from about 0.1 to 1.0% by weight of the water.

The term "silica compound" as used herein is intended to include both the inorganic or organic silicates and colloidal silicas. The colloidal silicas include both the solvent and aqueous systems. As an example, colloidal silica in an aqueous medium may include other ingredients such as thickeners, etc. to improve the application of the silica to the galvanized metal immediately upon being removed from the molten bath of zinc.

It is conventional in the industry, for example, for some coating applicators to remove the excess zinc by rapidly rotating the freshly coated metal parts in a basket, which is generally referred to as a "dip-spin coating method." Following this coating of zinc, the article is treated with the silica compound at a temperature near that of the zinc bath. It is essential to recognize that the silica treatment of the freshly prepared galvanized metal is not merely a coating of the silica on the surface of the galvanized substrate. Due to the high temperatures, it is believed that the silica reacts with the zinc to form a unique zinc-silicate complex which improves the white rust resistance.

As a specific example, where steel has been galvanized by the hot-dip process, i.e., by passing the metal through a molten dip comprising metallic zinc, the hot article with the zinc coating is treated by subjecting the coated metal to the silica compound, i.e., alkali metal silicates or silica $SiO_2$. Galvanized metal treated with the silica compounds in accordance with this invention were found to resist white rust or wet storage stains, as shown by the data presented in the examples.

Steel coupons were galvanized in a kettle, and then subsequently quenched in a silica solution in accordance with this invention. Example 1 shows that the silica treatment in accordance with this invention was equal to, or better than, the chromate treatment. Here, the chromate solution consists of 0.2% sodium chromate, and 0.5% sulfuric acid.

EXAMPLE 1

|  | Hours 24 | Tested 90 | (Scale 1–10) 192 |
|---|---|---|---|
| CONTROL (No Stack Test) | 10 | 10 | 10 |
| AIR COOL (No Chemical) | 5 | 4 | 3 |
| WATER QUENCH (No Chemical) | 4 | 3 | 2 |
| CHROMATE QUENCH | 6–7 | 6–7 | 4/5 |
| SILICATE SOLUTION of this invention (1.0% potassium silicate in $H_2O$) | 9 | 9 | 8 |

Note: One being the least and 10 being the most effective with respect to white rust protection.

EXAMPLE 2

|  | Hours 24 | Tested 120 | (Scale 1–10) 350 |
|---|---|---|---|
| CONTROL (No Stack Test) | 10 | 10 | 10 |
| AIR COOL (No Chemical) | 6.0 | 5 | 4 |
| WATER QUENCH (No Chemical) | 6/7 | 5/6 | 4/5 |
| POTASSIUM SILICATE (0.6%) | 8/9 | 7/8 | 6 |
| POTASSIUM SILICATE (0.3%) | 9 | 7/8 | 5 |

Example 2 is similar to Example 1, except the silica concentration was lowered from 1%, as shown in Example 1, to 0.3%, and 0.6%. Additional examples have given excellent results with silica concentrations as low as 0.1%. These Examples illustrate that lower concentrations of the silica compounds, i.e., concentrations ranging from 0.1% to 1.0%, are effective for protecting galvanized steel against white rust corrosion without substantially adversely affecting the appearance of the galvanized product.

The humidity cabinet test showed the silica treatment of this invention to be equal to or better than the chromate treatment for white rust protection.

The silica compound treatment in accordance with this invention is ideally applicable to steel tubing or strip, whereby the metal tubing, for example, is appropriately cleaned to remove any dirt or grease, and then heat-treated in a reducing atmosphere or passed through a flux to clean the surface. Subsequently, the cleaned metal is carried through the hot molten zinc at speeds which enable the bath to heat the tubing and wet the surface, thereby allowing the liquid zinc to metallurgically bond to the base metal as it is withdrawn from the molten bath. It is then wiped and subjected to the silica treatment, i.e., quenching in a potassium silicate solution at metal temperatures above about 125° C. for anywhere from about 5 to 60 seconds, and thereafter removed from the quenching bath and cooled. The treated galvanized metal is substantially improved with respect to damp storage and white rust corrosion, as indicated by the data in Examples 1 and 2.

The present invention provides a zinc-containing coating on metal which not only meets the extra corrosion resistance required of galvanized metal, particularly for steel strip useful in the manufacture of automobiles and the like, but also is capable of being welded, painted, and otherwise used in a conventional manner when compared with the untreated galvanized metals. Field tests have also shown that galvanized steel treated with this invention gives a product with superior paint adherence when compared with untreated or chromated galvanized steels.

While this invention has been described with respect to a number of specific embodiments, it is obvious that there are other variations and modifications which can be employed without departing from the scope of the invention as particularly pointed out in the appended claims.

What is claimed is:

1. A process of protecting metal from white rust which comprises coating the metal with molten zinc or zinc alloy and subsequently directly contacting the zinc-coated metal at a metal temperature of at least 125° C. with a protective amount of a silica compound to form a chemically reacted coating with the zinc-coated metal, said silica compound being selected from the group consisting of sodium silicate, potassium silicate, an organic silicate, and silica.

2. The process of claim 1 further characterized in that the silica compound comprises an aqueous solution of sodium and/or potassium silicate.

3. The process of claim 1 further characterized in that the silica compound comprises silica ($SiO_2$).

4. The process of claim 1 further characterized in that the silica compound is an organic silicate.

5. The process of claim 4 further characterized in that the organic silicate is a lower molecular weight alkyl silicate.

6. The process of claim 1 further characterized in that the temperature of heating the zinc-coated metal with the silica compound is above 150° C.

7. The process of claim 1 further characterized in that the silica compound is an alkali metal silicate.

8. The process of claim 7 further characterized in that the alkali metal silicate is potassium silicate.

9. A process for protecting metal from white rust which comprises coating the metal with molten zinc or a zinc alloy and subsequently directly contacting the zinc-coated metal at a metal temperature of at least 150° C. with a protective amount of an aqueous solution of an alkali metal silicate to form a chemically reacted coating with the zinc-coated metal, said aqueous solution of the alkali metal silicate comprising from about 0.1 to about 5.0% by weight of sodium and/or potassium silicate.

10. A process according to claim 9, wherein the step of directly contacting the zinc-coated metal with said aqueous solution includes forming zinc-silicate complexes.

11. A process according to claim 10, wherein the process provides said white rust protection without the use of chromium compounds.

12. A process according to claim 1, wherein the step of directly contacting the zinc-coated metal with said silica compound includes forming zinc-silicate complexes.

13. A process according to claim 12, wherein the process provides said white rust protection without the use of chromium compounds.

14. A process for protecting metal from white rust without using chromium compounds comprising coating the metal with molten zinc or a zinc alloy to form a zinc-coated metal, and directly contacting the zinc-coated metal at a metal temperature of at least 125° C. with a silica compound to form a chemically reacted coating with the zinc-coated metal, said silica compound being selected from the group consisting of sodium silicate, potassium silicate, an organic silicate, and silica.

15. A process according to claim 14, wherein said silica compound comprises an aqueous solution of sodium and/or potassium silicate.

16. A process according to claim 15, wherein said sodium and/or potassium silicate is present in an amount ranging from 0.1 to about 5.0% by weight.

17. A process according to claim 16, wherein said chemically reacted coating includes silicon ions in the zinc coating.

18. A process according to claim 16, wherein said chemically reacted coating includes zinc-silicate complexes.

* * * * *